United States Patent
Mercier

(10) Patent No.: US 7,203,955 B2
(45) Date of Patent: *Apr. 10, 2007

(54) HIGH DEFINITION MEDIA STORAGE STRUCTURE AND PLAYBACK MECHANISM

(75) Inventor: Guillaume Mercier, McLean, VA (US)

(73) Assignee: Digital Video Express, L.P., Richmond, VA (US)

( * ) Notice: Subject to any disclaimer, the term of this patent is extended or adjusted under 35 U.S.C. 154(b) by 15 days.

This patent is subject to a terminal disclaimer.

(21) Appl. No.: 11/017,927

(22) Filed: Dec. 22, 2004

(65) Prior Publication Data

US 2005/0114909 A1    May 26, 2005

Related U.S. Application Data

(63) Continuation of application No. 09/540,557, filed on Mar. 31, 2000, now Pat. No. 6,865,747.

(60) Provisional application No. 60/127,394, filed on Apr. 1, 1999.

(51) Int. Cl.
*H04N 7/16* (2006.01)

(52) U.S. Cl. .......................... 725/141; 386/94; 386/98; 386/125; 386/126

(58) Field of Classification Search ................. 725/94, 725/31, 141, 153; 386/94, 83, 68, 98, 125–126
See application file for complete search history.

(56) References Cited

U.S. PATENT DOCUMENTS

| | | | | | |
|---|---|---|---|---|---|
| 5,720,037 | A | * | 2/1998 | Biliris et al. | 725/94 |
| 5,771,335 | A | * | 6/1998 | Lee | 386/68 |
| 5,867,625 | A | * | 2/1999 | McLaren | 386/68 |
| 5,889,868 | A | * | 3/1999 | Moskowitz et al. | 713/176 |
| 5,936,968 | A | * | 8/1999 | Lyons | 370/503 |
| 6,683,987 | B1 | * | 1/2004 | Sugahara | 382/235 |
| 6,865,747 | B1 | * | 3/2005 | Mercier | 725/94 |

\* cited by examiner

*Primary Examiner*—Vincent F. Boccio
(74) *Attorney, Agent, or Firm*—David G. Grossman; David Yee

(57) ABSTRACT

An apparatus and method for storing and playing high definition content is disclosed. This invention provides a mechanism for storing and playing back high definition content on a medium such as DVD optical disc. One aspect of the invention is that elementary streams may be multiplexed and processed in a high definition media player instead of at authoring time. Another aspect of the invention is that it provides for extended real-time features such as inserting watermarks into the content stream, decrypting selected sections of the content stream, and performing trick playback display modes.

24 Claims, 12 Drawing Sheets ns as possible. These new storage structures and playback mechanisms will preferably support methods to prevent unauthorized access to the HDDC and to track any unauthorized access to HDDC. It is also desired that these new structures and playback mechanisms will support trick playback modes. The present invention broadly relates to and provides a solution to these problems.

HIGH DEFINITION MEDIA STORAGE STRUCTURE AND PLAYBACK MECHANISM

CROSS-REFERENCE TO RELATED APPLICATIONS.

This application is a continuation of application Ser. No. 09/540,557, filed Mar. 31, 2000, now U.S. Pat. No. 6,865, 747, which claims the benefit of Provisional Application No. 60/127,394, filed Apr. 1, 1999, the contents of which are incorporated by reference herein.

FIELD OF THE INVENTION

The present invention relates to high definition media storage structures and playback mechanisms.

BACKGROUND OF THE INVENTION

Mechanisms for storage and processing of digital content on various media have been defined for various digital content playback systems. Recently, the resolution of digital content has increased. This content is now referred to as high definition digital content (HDDC). Current storage structures and playback mechanisms were not designed specifically for HDDC. There is a need for new storage structures and playback mechanisms for HDDC that introduce as little impact on current storage structures and play back mechanisms as possible. These new storage structures and playback mechanisms will preferably support methods to prevent unauthorized access to the HDDC and to track any unauthorized access to HDDC. It is also desired that these new structures and playback mechanisms will support trick playback modes. The present invention broadly relates to and provides a solution to these problems.

While the description which follows may sometimes be described in the context of audio/video/data as an example of content, the invention is not so limited and may equally apply to any type of information or content data, including without limitation audio and/or video data or other type of data or executables.

The invention is described in terms of the current best mode. This best mode is described as extensions of the DVD Specifications for Read-Only Disc (described in "DVD Specifications for Read-Only Disc", Version 1.1, December 1997 by Toshiba Corporation) to support high resolution, encrypted and actively watermarked content. Media conforming to these extensions are referred to in this document as HD-DVD. Playback mechanisms which present the HDDC content to an ATSC/HDTV compatible receiver are also disclosed. These mechanism allow graphics, trick modes, and watermarking to be extended to HDTV. One skilled in the art can see that although the present invention is described in terms of HD-DVD, the invention may be practiced on any digital storage media including hard disks, magnetic tape, and other optical discs.

The present application is directed to the same general technology as co-pending commonly assigned patent application Ser. No. PCT/US00/00079, entitled "Content Packet Distribution" naming Schumann et al. as inventors (the contents of which are incorporated by reference herein). This application is directed more to specific storage structures and playback mechanisms including watermark insertion, trick modes, and ATSC stream generation.

In some commercial applications, where the content includes, for example, valuable audio or video content, unauthorized access by those who obtain the content may tend to reduce the profit margin of the content provider(s), who typically provide the content, e.g. to various listener and/or viewers, for a fee. In particular, with the advent of high definition video, this problem is even more serious because the digital data is of sufficient resolution to be shown on a full size theater screen. This opens up a whole new area for content pirates to market their stolen property. If the unauthorized accesser is a content pirate, he or she may pose a serious threat to a content provider by inducing others to pirate the content as well. More particularly, the pirate may generally sell pirated access to the content at a lower cost than the legitimate content provider because the pirate obtains access to the content by using the legitimate provider's infrastructure and therefore does not have to invest resources to produce and disseminate the content. This becomes even a greater concern where the pirate may copy and mass produce a relatively inexpensive component which allows a large number of users to obtain access to the content without authorization by the legitimate content provider. As a result, content providers have resorted to increasingly expensive and complex schemes to prevent unauthorized access to their information and content, i.e. to prevent pirating.

What is needed is a system and method for protecting valuable content; a method and system which is robust, which may be tailored to the needs of a particular content provider, and which overcomes the above noted deficiencies.

SUMMARY AND ADVANTAGES OF THE INVENTION

One advantage of the invention is that it allows a disc to be authored where the disc may be played by both conventional media players and high definition media players.

Another advantage of this invention is that elementary streams may be multiplexed and processed in the high definition media player instead of at authoring time.

Yet a further advantage of this invention is that it provides for extended real-time features such as inserting watermarks into the content stream, decrypting selected sections of the content stream, and performing trick modes.

To achieve the foregoing and other advantages, in accordance with all of the invention as embodied and broadly described herein, an apparatus for playing high definition content comprising a media player for receiving the high definition content from a media source. The high definition content is contained in data packets and the data packets are contained in sectors. A content processor processes the high definition content into transport packets and a transport packet modulator modulates the transport packets. A controller manages the operations of the apparatus.

In yet a further aspect of the invention, the apparatus for playing high definition content further includes a watermark buffer for receiving watermark data; a video buffer for receiving video data; an audio buffer for receiving audio data; a watermark inserter for inserting watermarks into the video data, determined by the video data and watermark data; a content multiplexer; and a transport packet generator.

In yet a further aspect of the invention, preselected bocks of the data packets are encrypted.

In yet a further aspect of the invention, the apparatus further includes a trick mode processor that can: create a slow motion effect by inserting empty predictive frames into a video elementary stream between picture frames; create a pause effect by iteratively inserting into the video elementary stream a sequence comprising an Intra-coded picture frame; and a multitude of predictive frames; create a fast forward playback effect by inserting forwardly sequenced Intra-coded picture frames interspersed with empty predictive frames into the transport packet stream; and create a rewind playback effect by inserting reverse sequenced Intra-coded picture frames interspersed with empty predictive frames into the transport packet stream.

In a further aspect of the invention, a method for playing high definition content comprising: receiving the high definition content from a media source, the high definition content contained in data packets and the data packets contained in sectors; processing the high definition content into transport packets; modulating the transport packets; and outputting the modulated transport packets.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawing, which are incorporated in and form a part of the specification, illustrate an embodiment of the present invention and, together with the description, serves to explain the principles of the invention.

DETAILED DESCRIPTION OF THE INVENTION

The present invention provides for storing high definition content on a DVD or other storage media by extending the current specification of DVD read-only disc. The global disc layout may remain identical, preserving software investments for DVD authoring tools & player firmware, but higher video resolution and bit rates are allowed. HD-DVD players may not need any MPEG-2 video or AC-3 audio decoders, but may use instead a real-time content processor 214 and a modulator 216. This invention also provides for various "trick modes", including fast forward, reverse, slow motion, and pause. Also provided for are mechanisms that may allow the content to be encrypted and watermarked.

Encryption may be done on video, audio or other elementary streams during authoring, and may be based on blocks of consecutive bytes. Alignment methods ensures the mapping of encrypted blocks to the payload of a transport packet, and some rules define the conditions under which a block may or may not be encrypted, and where an encrypted block has to start. The transmission of watermarks in encrypted format to the TV receiver follows a buffering method and individual watermarks may be grouped in time stamped access units. Trick modes are also possible by slightly altering the content of video access unit headers and by inserting or suppressing MPEG-2 video frames. Finally, backward compatibility of, the new system is possible if the audio and video formats of the classic DVD are supported by the ATSC standard (AC-3 audio, MPEG-2 video). MPEG graphics may also be supported.

Reference will now be made in detail to the presently preferred embodiments of the invention, examples of which are illustrated in the accompanying drawings.

Figure 1:
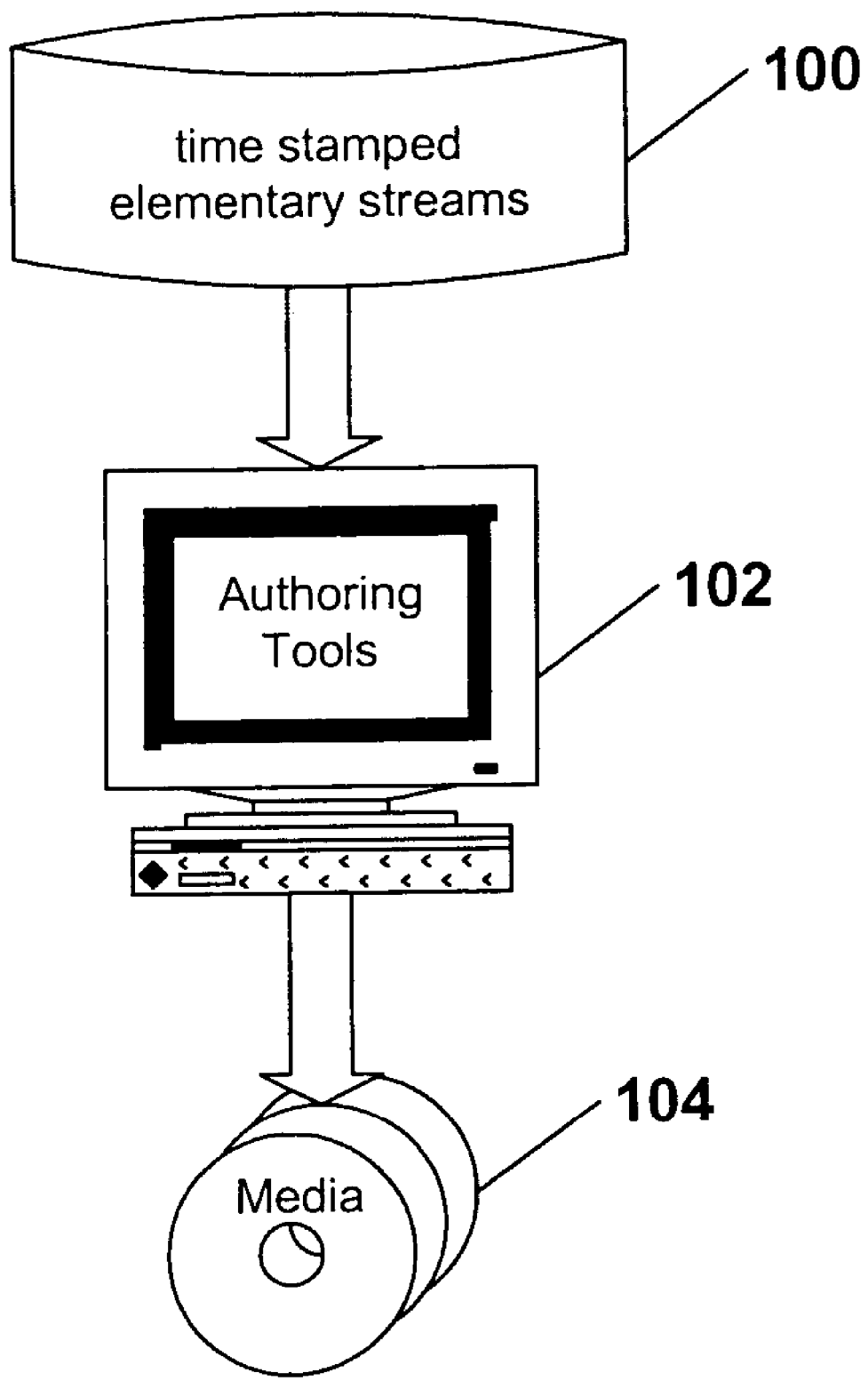
FIG. 1 is a block diagram of a high definition content authoring system.

A block diagram of a high definition content authoring system is shown in FIG. 1. Authoring systems are used to create the final image of the digital content in a format compatible with the intended display system. Time stamped elementary input streams 100, including audio and video input streams formatted as MPEG-2 video and AC3 audio respectively, may be multiplexed together by the authoring tool 102 as they would be with a classic DVD, including data for multiple angles and parental levels. The authoring tool 102 is in charge of creating system files for Video Manager and Video Title Sets, one or more MPEG-2 program stream including navigation packs (Video Objects), and storing them as a disc or set of discs 104. In the presently illustrated embodiment, the discs 104 may be UDF formatted.

Figure 2:
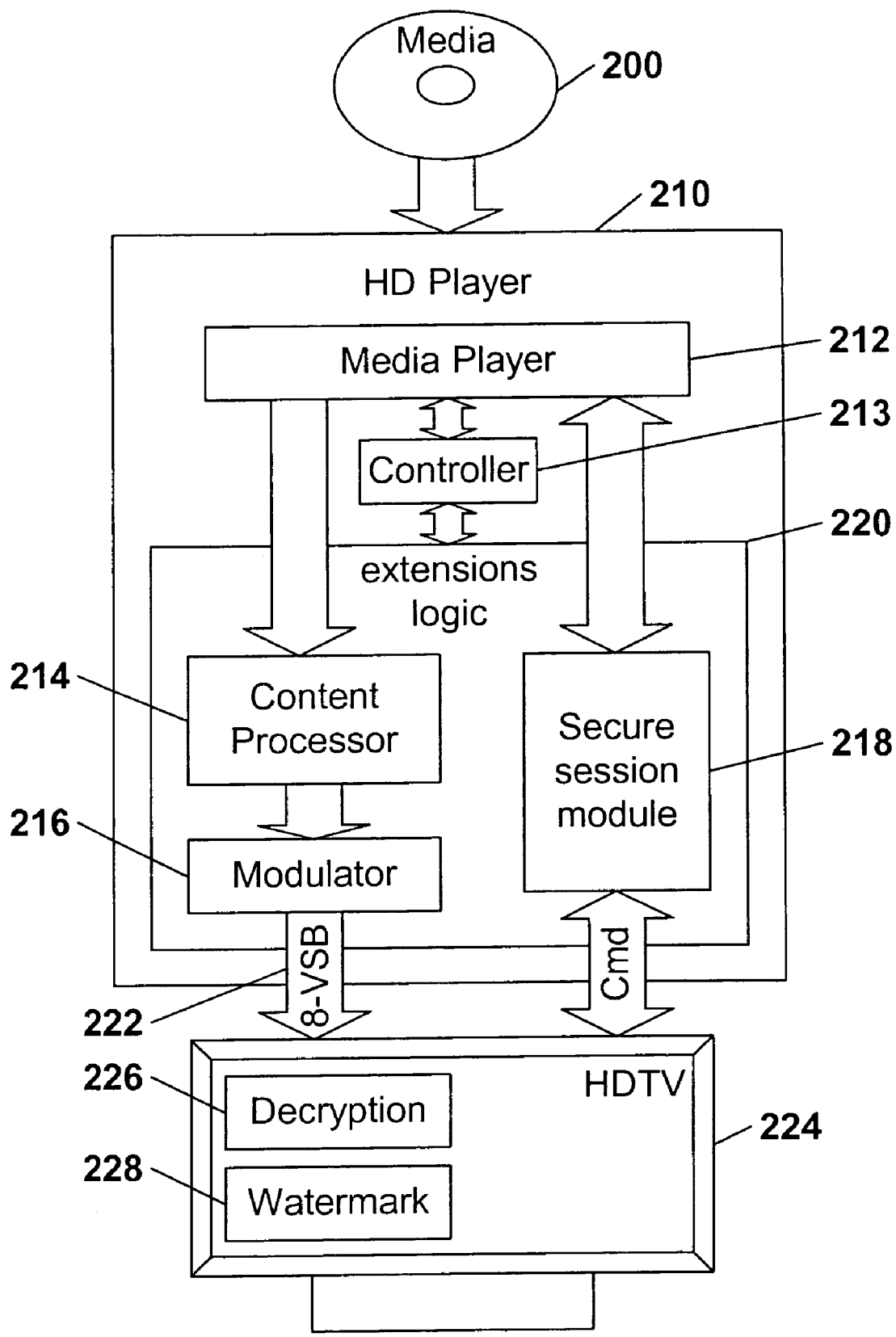
FIG. 2 is a block diagram of an embodiment of an aspect of the present invention used to playback high definition content.

FIG. 2 is a block diagram of an embodiment of an aspect of the present invention used to playback high definition content. The disc(s) 200 containing authored content may be inserted in a HD-DVD enabled player 210. The player has a media player 212 that process the DVD specifications and extensions logic 220 that process the HD-DVD extensions. Together, the media player logic 212 and extensions logic 220 interpret the contents of the disc(s) 200 to create a combination of graphic menus and audio/video streams.

An embodiment of the present invention may include a secure session module 218, so that secured communication may be established with the receiver before content playback may be authorized.

To send data to the receiver, the program streams stored on the disc 200, or generated by an MPEG graphic engine are converted to an ATSC/HDTV transport stream by the content processor 214. The stream is then modulated by a modulator 216 and sent to an HDTV receiver 224. The present embodiment used 8-VSB modulation, however, any type of modulation capable of transporting the digital content may be used.

The receiver 224 demodulates the signal and reconstructs the transport stream packets, which are sent to their intended destinations which may include a decryption encoder 226, audio and video decoders, or watermark logic 228.

DVD Read Only vs. HD-DVD Specifications

The HD-DVD extensions may closely follow the DVD Specifications for Read-Only Disc, may enlarge the range of video formats allowed and may allow higher data rates on the disc. In the embodiment of the present invention, wherein compatiblity with the ATSC/HDTV standard is desired, only those video and audio formats defined in the ATSC/HDTV standard may be used when the HD-DVD contains high definition material intended for HDTV display. The term 'HD mode' refers to when the HD-DVD player plays a disc with features not found in the DVD specifications for Read-Only disc.

A detailed description of the new parameter boundaries and constraints may be defined, in particular in the interleaved units minimum jump sizes that a HD-DVD player has to meet for multi-angle blocks. Areas that that may be extended for HD-DVD includes: parts of the video objects such as the contents of VOB, the player reference model, the presentation video, audio and sub-picture unit data; restrictions for seamless play; restrictions of SP_DCCMDs; relation between Information in disc and player; display mode; position and allowed line number's range of video and sub-picture; and karaoke mode in MPEG-2 audio.

In HD mode, the MPEG-2 video and audio configuration (i.e. bit rate, profile, level, AC3 for audio) may need to meet the ATSC/HDTV standard requirements. Audio and video streams stored as an MPEG-2 program stream on the disc may be converted to an ATSC/HDTV compliant transport stream by the Content processor 214.

Audio & Video Demultiplexing

Figure 3A:
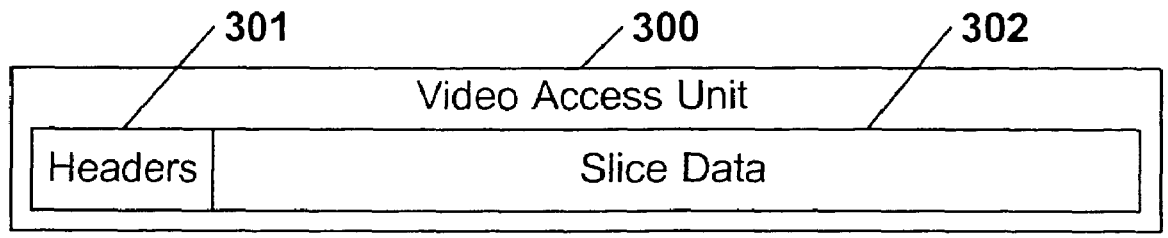
FIG. 3A is a block diagram showing an example of a video data packing format.

Extracting audio and video access units may be performed by extracting the payload of each corresponding packet. A start code search may be done to find each access unit's boundaries, unless pointers are added on the disc as private data. As shown in FIG. 3A, each MPEG video access unit (VAU) 300 may include a header 301 and slice data 302, where headers may comprise one of the two descriptions as illustrated in FIGS. 3B and 3C.

Figure 3B:
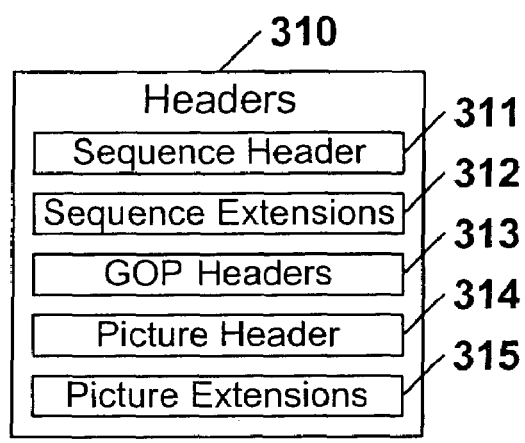
FIG. 3B is a block diagram showing an example of a video data packing format header.

FIG. 3B is a block diagram showing an example of a video data packing format header 310 which may include a sequence header 311, sequence extensions 312, GOP (group of picture) headers 313, picture headers 314 and picture extensions 315.

Figure 3C:
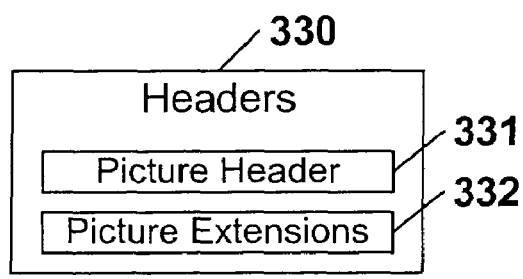
FIG. 3C is a block diagram showing another example of a video data packing format header.

FIG. 3C is a block diagram showing another example of a video data packing format header 330 which may include a picture header 331 and a picture extensions 332.

An AC3 audio frame may start with a sync word 0xB77 and be encoded at constant bit rate, which makes frame extraction quicker.

Timing Constraints

Timestamps include several components including a Tref, a Decoding Time Stamp (DTS), and a Presentation Time Stamp (PTS). The DTS represents the time to decompress the frame. The PTS represents the the time to present the frame. Tref is a temporal reference number. Obtaining a time stamp for each MPEG video access unit (PTS and DTS) can be done during VAU extraction, by using the PTS and DTS fields found in PES packet headers of DVD sectors. Only I frames are required to have PTS and DTS. Time stamps for other pictures can be computed, but at the expense of extra memory to store data until the next reference frame (the DTS of a reference frame should be equal to the PTS of the previous reference frame). Time stamps may also be inserted at DVD authoring time to reduce memory requirements in the player.

Figure 4:
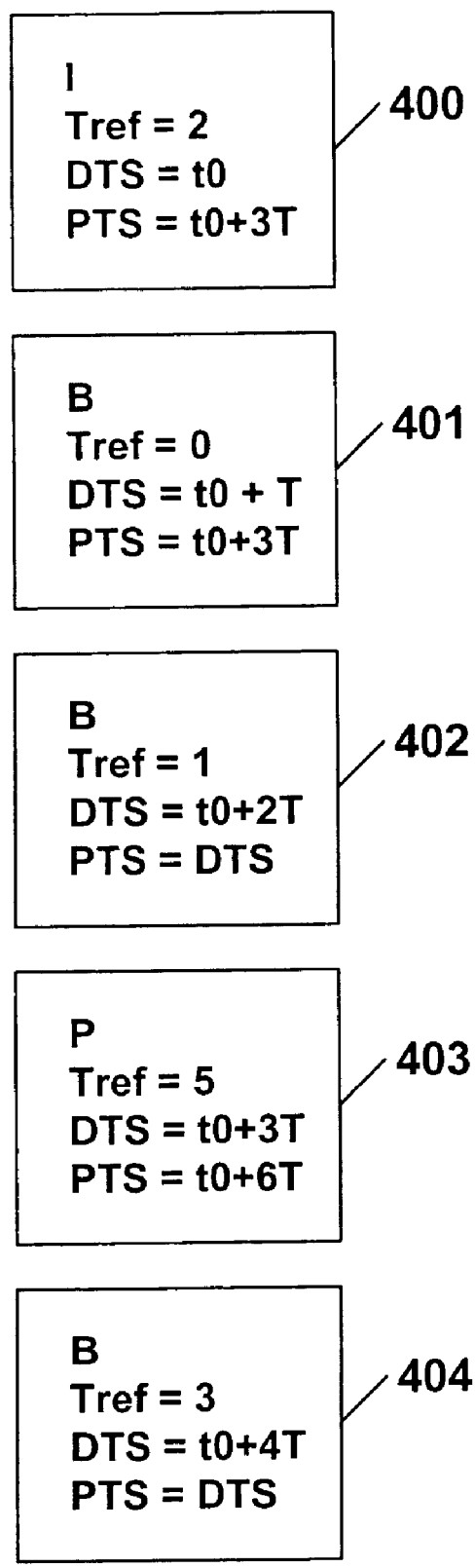
FIG. 4 is a diagram depicting timestamp calculations from a video bit stream.

An example of DTS and PTS computation from a video bit stream, when only the first PTS and DTS are known is illustrated in FIG. 4. Timestamps 400, 401, 402, 403 and 404 represent a sequence of timestamps. Timestamp 400 corresponds to an I frame. Timestamp 403 corresponds to a P frame which is derived from an I frame. Timestamps 401, 402 and 404 correspond to B frames which may be derived by either P frames, I frames, or both.

AC3 audio streams may be encoded at constant bit rate, in which case the PTS can be computed by linear extrapolation.

Multiplexing Streams

A novel aspect of the present invention is that the transport multiplexing module may run independently in the player. Previous art usually performs this task in the authoring tool. In the presently illustrated example, there are three inputs: a video stream, an audio stream, and private data streams, each access unit being sent with a corresponding set of time stamps. In movie play mode, the streams are multiplexed according the MPEG-2 specifications, the private data stream following a buffer model similar to the audio stream. The timestamped private stream may be used to assist in watermarking the content at runtime using a corresponding watermark access unit.

In MPEG graphics mode, the background is sent as an I frame and picture elements are added using P frames. Techniques similar to trick mode play may be used to build a valid, time stamped, MPEG-2 elementary stream that may be sent to the transport multiplexing module.

Any DVD authored according to the DVD Specifications for Read Only Disc with video and audio format supported by the ATSC (MPEG-2 video and AC3 audio) may offer a valid input for the transport multiplexer 214 and may be sent to an ATSC compliant HDTV through an 8-VSB interface 222.

Storage, Format and Procedures to Handle Encrypted Content

Figure 5:
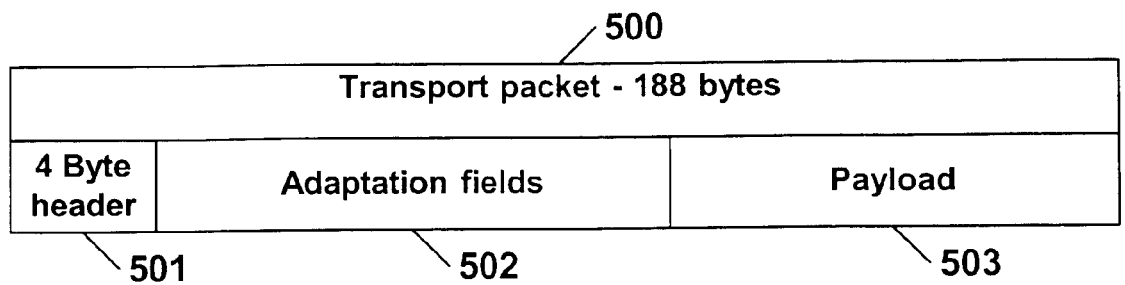
FIG. 5 is a block diagram of an ATSC transport packet.

Another novel feature of the present invention is that it allows content to be independently encrypted on a block by block basis. The DVD storage format is based on 2048 bytes per logical sector. This format is only used for storage, and the transmission of data may be done with ATSC transport packets of 188 bytes:

FIG. 5 is a block diagram of a 188 byte ATSC transport packet 500. The Transport packet 500 may include a 4 byte header 501, an adaption field 502, and a payload 503. When a packet has no adaptation field 502, the payload 503 may have a size of 184 bytes. When an adaptation field 502 is present, to carry a PCR or padding bytes for example, the number of bytes of the payload 503 may be reduced accordingly.

Figure 6:
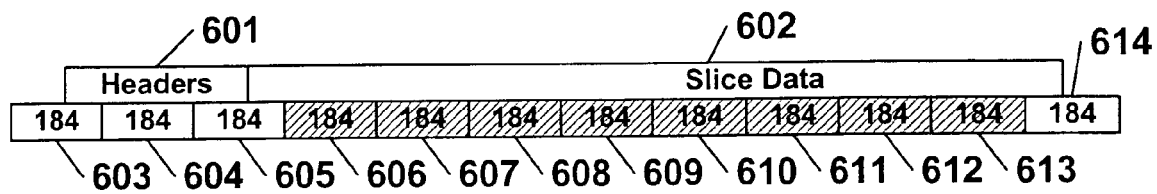
FIG. 6 is a block diagram showing how video access unit data may be encrypted as per an embodiment of the invention.

FIG. 6 is a block diagram showing how video access unit data may be encrypted as per an embodiment of the invention. To allow a real-time conversion from a time stamped MPEG-2 video stream and a time stamped AC3 audio stream to a valid transport stream, some fields in the headers 601 may have to be read and/or modified. For this reason, they may not be encrypted. In a video access unit the encryption may start on the first 184 byte block 606 completely contained in the slice data area 602, continue through blocks 607, 608, 609, 610, 611, 612 and stop on the last 184 byte block 613 completely contained in the slice data area. Not all of these blocks have to be encrypted, but no other blocks may be encrypted in the video stream. Therefore, blocks 603, 604, 605 and 614 are not encrypted.

Audio streams can be encrypted in a less restrictive manner, since the size of an access unit can be predicted. For example, only 1 out of 10 audio access units can be left unencrypted.

Figure 7:
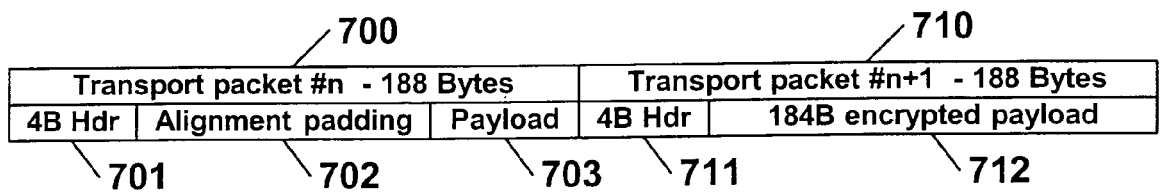
FIG. 7 is a block diagram showing alignment of encryped data in the transport payload as per an embodiment of the invention.

A major problem with encryption of elementary streams is to avoid any misalignment between elementary stream encrypted data and transport streams packet decryption. FIG. 7 is a block diagram showing alignment of encrypted data in the transport payload as per an embodiment of the invention. Transport packet 700 contains a 4-byte header 701, alignment padding bytes 702, and payload bytes 703. The second transport packet 710, includes a 4 byte header 711 and 184 bytes of encrypted payload data 712. A solution to this problem, if it occurs, is to insert padding bytes 702 in the last packet 700 preceding a group of encrypted packet 710 to ensure the correct alignment of the 184 bytes of the transport packet payload 712 (a transport packet cannot contain both encrypted and unencrypted data). If the data is encrypted as previously described, then only one padding operation is required, in the last packet preceding the blocks of encrypted slice data. When an adaptation field must be sent during the transmission of encrypted packets, to transmit PCR for example, then an extra transport packet may be inserted with an adaptation field but no payload at all, in order to preserve the encryption alignment.

A method to signal in each frame which 184 bytes block is encrypted, and which one is not is now described. A header made of a few bytes in each DVD sector is used. One byte indicates the number of bytes in the payload before the beginning of the first 184 byte block. Then 11 groups of 2 bits may be used to store the MPEG-2 transport scrambling control field. One bit indicates if the sector contains any encrypted data. A total of 31 bits may be required. Those bits may be stored over an unused DVD sector packet header field, like SCR, when the VOBS has encrypted content. Another option may be to simply encrypt all data, and set a flag in a global header.

In summary, video elementary stream may be partitioned in blocks of 184 consecutive bytes, and each of these blocks which only contain slice data and only slice data can be encrypted. To restore the alignment of these blocks with the payload of a transport packet, padding bytes may be used in the adaptation field of the transport packet preceding an encrypted transport packet. To preserve the alignment of the payload when an adaptation field is required, an extra packet with no payload may be inserted.

Allowing the occasional insertion of padding bytes and packets without payload, the bit rate of the video elementary stream may be carefully adjusted to avoid any video buffer overflow. This constraint may be combined with the bandwidth requirements of watermark information.

Watermarking Support

Figure 8:
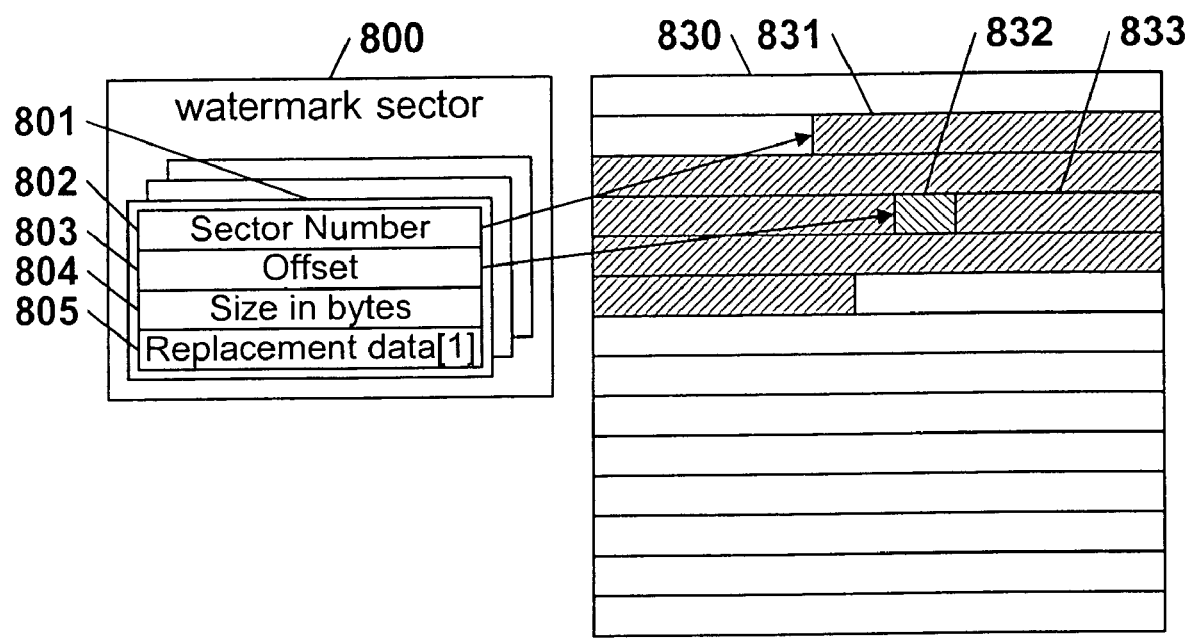
FIG. 8 is a block diagram of watermark sectors as performed by some current non-HD systems.

An example of current watermark technology is illustrated in FIG. 8. Watermark sectors 800 are performed on this non-HD systems by inserting private sectors 801 at authoring time to store watermark information (mainly replacement data and location for each watermark). The location of a watermark is identified by 3 parameters: A physical sector number 802, an offset in the sector 803, and the length in bytes 804. When a sector 831, 832, and 833 is received from data on the disc 830, the sector number is compared with those in the watermark table and if a replacement is required, replacement data 805 is written into the sector 832 at the location indicated by the offset.

Figure 9:
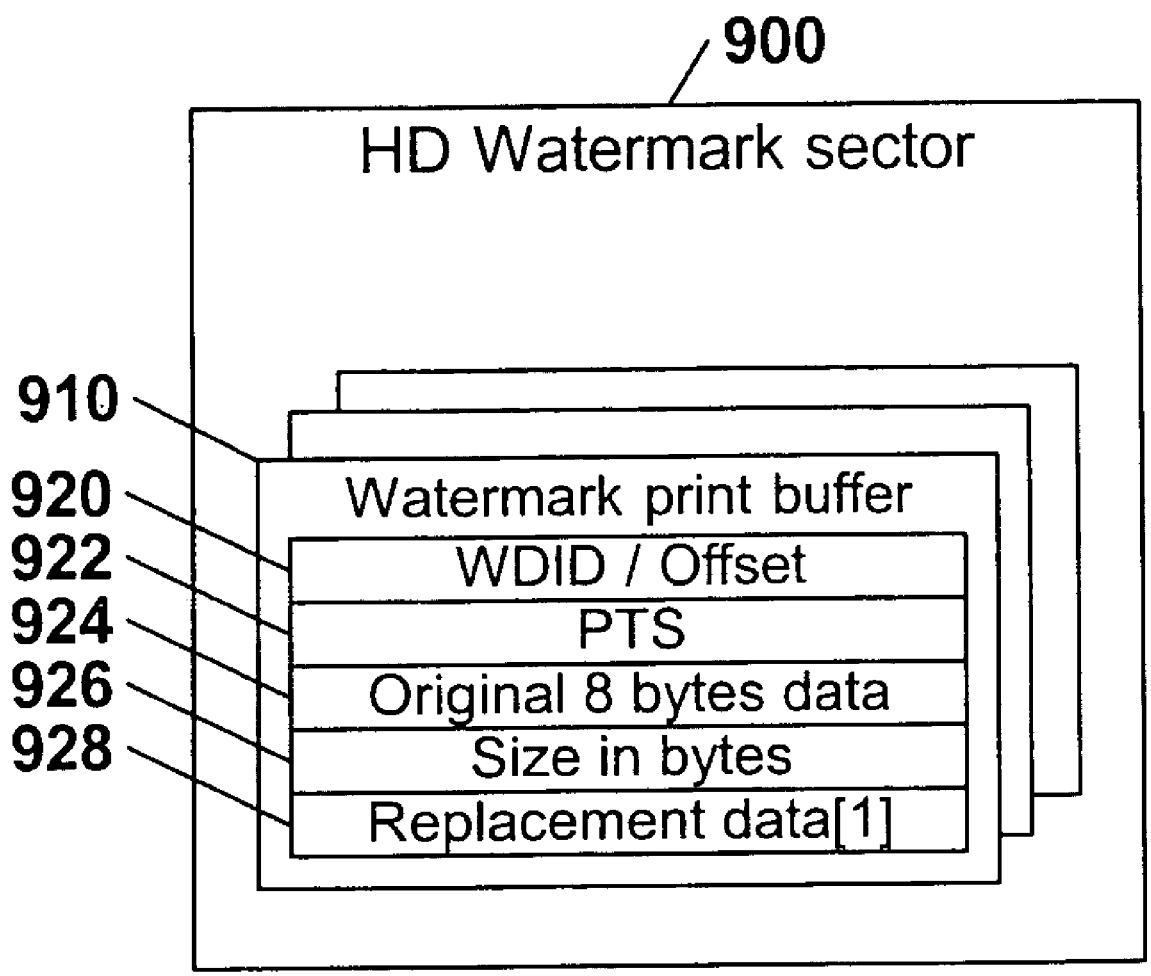
FIG. 9 is a block diagram of HD watermark sectors as performed by an exemplary aspect of the present invention.
Figure 10A:
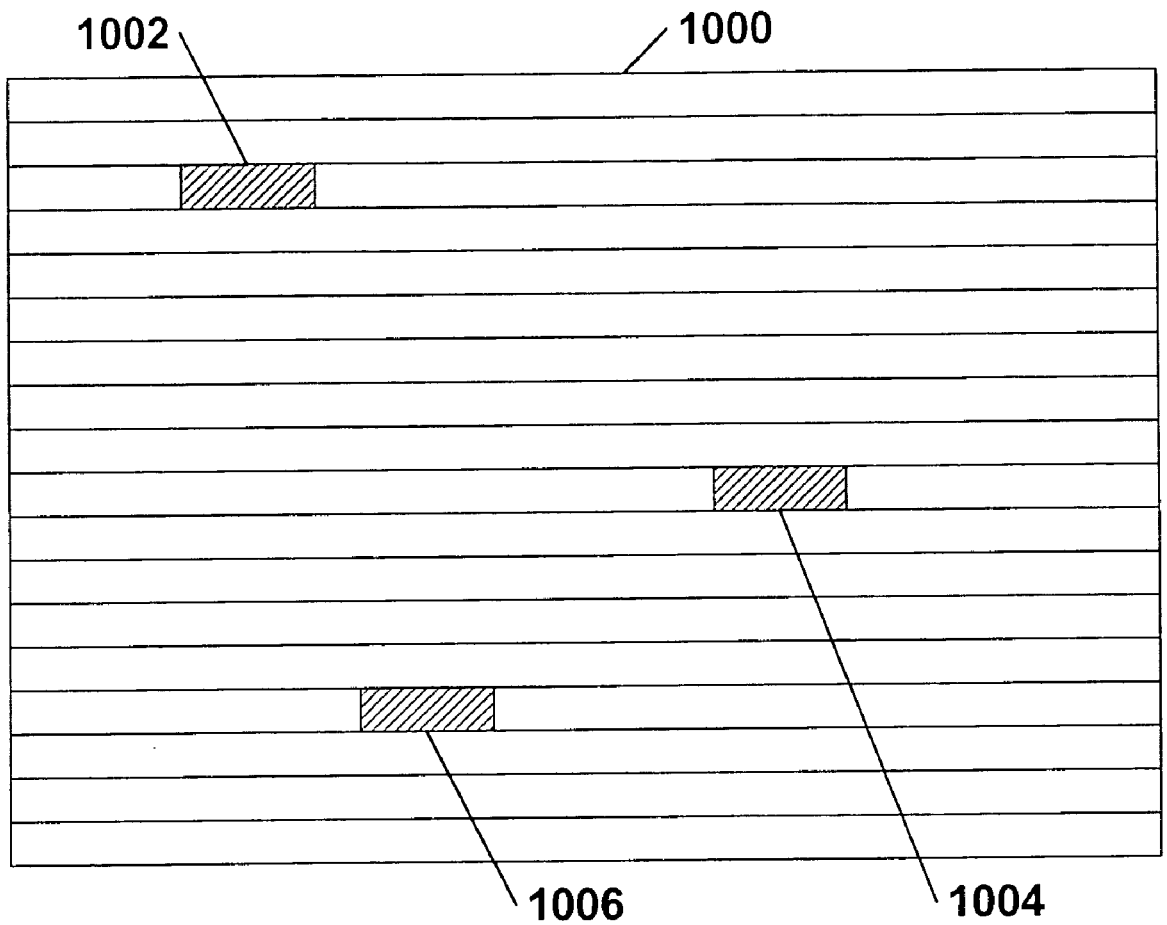
FIG. 10A is a block diagram of an exemplary aspect of the present invention depicting watermark markers in a frame of video data.
Figure 10B:
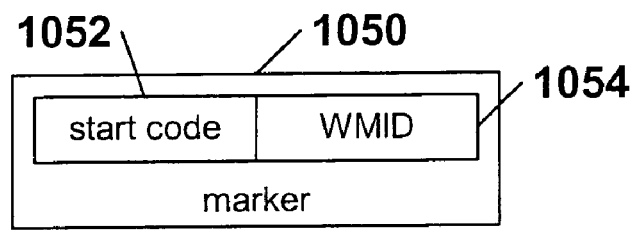
FIG. 10B is a block diagram of an exemplary aspect of the present invention depicting a watermark marker structure.

Refering to FIGS. 9, 10A, and 10B, we will now discuss the aspect of the present invention that implements content watermarking. FIG. 9 is a block diagram of HD running sectors as performed by an exemplary aspect of the present invention where watermark technology may be preserved by only changing location information of the watermarks. FIG. 10B is a block diagram of an exemplary aspect of the present invention depicting a watermark marker structure.

In the HD-DVD context, the receiver is in charge of inserting watermarks and has no knowledge of DVD physical sectors. A solution to this problem is to assign an identifier to each watermark and insert the identifier in the video where the watermark must be inserted as illustrated in FIG. 10. In FIG. 10A, markers 1002, 1004, and 1006 are inserted in the video content 1000 where a watermark is intended to be written. The markers 1050 includes a start code 1052 and a watermark ID 1054. One skilled in the art will recognize that many different marking schemes may be used to indicate locations for watermark insertions.

As presently illustrated, the current embodiment uses an 8 byte watermark that is overwritten. The ID 1052 may be a 4 byte long watermark start code such as 0x000001BA. The sequence number 1054 may be a 4 byte unique watermark identifier, WMID 920. The watermark sector number 802 and offset 803 used in the prior art are replaced by the WMID 920 in the watermark sector. The original 8 bytes of data may be saved in the watermark sector and the PTS of the picture to which the watermark applies allows the transport stream multiplexer 214 to send the watermark data in real-time. For example, the WMID 920 may be an incrementing counter starting at 0x0200 to avoid generating start codes.

An alternative method would to use the WMID/offset 920 as an offset into the frame. This method would not require any markers in the video data.

As described above, the watermarks are stored in HD watermark sectors 900. A group of watermarks with the same PTS 922 may be referred as a watermark access unit and may be stored in the same physical sector. This access unit may follow a watermark buffering model, which may be described with a leak rate and buffer size that may be defined depending on the bandwidth allowed for watermarks (This buffering model is described the MPEG-2 standard). The transport multiplexer 214 may ensure that each access unit arrives in time in the watermark buffer.

When a picture is received and watermarks have to be inserted, the picture may be scanned for the watermark start codes which are followed by the WMID 920. The watermark buffer 910 has the corresponding WMID 920 information to either restore the original 8 bytes 924 (start code and WMID) or to insert the replacement data 928. The size of the replacement data 926 may be stored as part of the watermark buffer 910. If the corresponding WMID 920 is not in the buffer, then a pirate attack is very likely to have occurred. The TV may decide to wait a few seconds and turn the screen dark, refusing content playback.

If the start code search method is too demanding in CPU resources in the TV, an offset from the first byte of the slice data could indicate the location of each watermark.

Encryption of watermarks may be done on a watermark access unit level. Watermarks belonging to the same frame (i.e. watermarks having the same PTS) may be grouped together in a more efficient manner to allow encryption: a watermark access unit header followed by watermark data. The header could be composed of the DTS, number of watermarks in the access unit, size in bytes, and would not be encrypted. The rest of the data could be encrypted and aligned by the transport multiplexer 214 with the same method that for video access units. Not encrypting the header should not compromise the security of the system since the WMID found in the picture at watermark insertion time must match the watermark data, and watermarks attacks can be detected.

Figure 11:
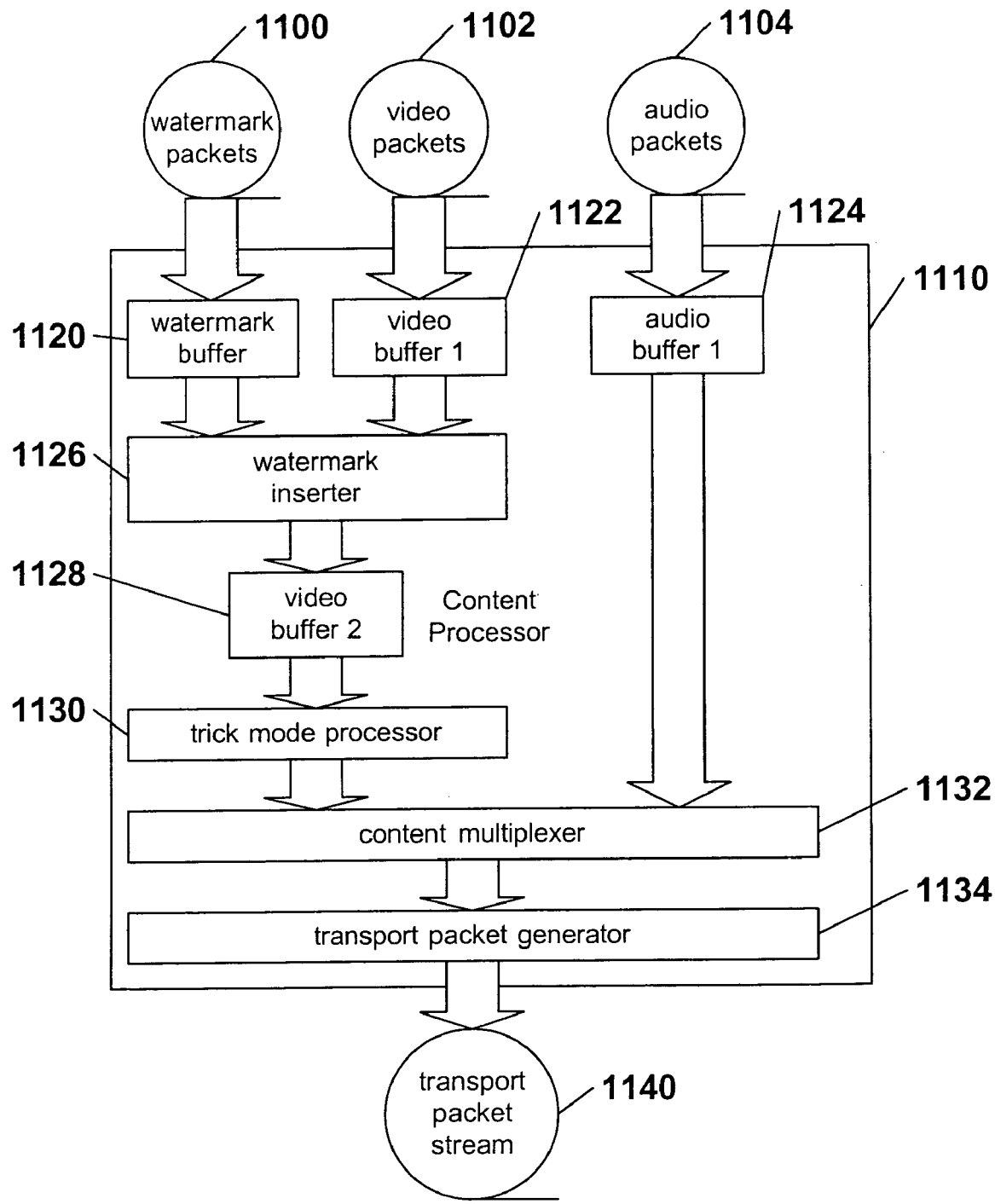
FIG. 11 is a block diagram of an exemplary aspect of the present invention depicting a content processor.

FIG. 11 is a block diagram of an exemplary aspect of the present invention depicting a content processor 1110 that is configured to input elementary streams, insert watermarks, perform trick mode display functions, multiplex audio and video content, and formats the resultant data into a valid output transport stream 1134 such as ATSC for output. The elementary streams include watermarking packets 1100, video packets 1102, and audio packets 1104. The watermarking packets are input into a watermarking buffer 1120. A watermark inserter 1126 inputs watermark sectors from the watermark buffer 1120 and inserts watermarks into the video data stored in a first video buffer 1122 for output into a second video buffer 1128 using watermarking techniques that were discussed previously. The video packets 1102 are input into a first video buffer 1122. The data is then transferred into a second video buffer 1128 where the video data is combined with watermarks. Next, the data stored in the second video buffer 1128 may be input to a trick mode processor 1130 where output display trick modes may be performed on the video streams. The audio packets 1104 are input into an audio buffer 1124. Data processed by the trick mode processor 1130 and the audio buffer 1124 are both input into a content multiplexer 1132 which combines the data into a combined data stream. The combined data stream is then input into a transport packet generator 1134, which formats the data into a transport packet stream 1140 such as ATSC. One skilled in the art will recognize that a content processor could be built to handle other types of data instead of or in combination with the watermark, video and audio data types discussed here.

Figure 15:
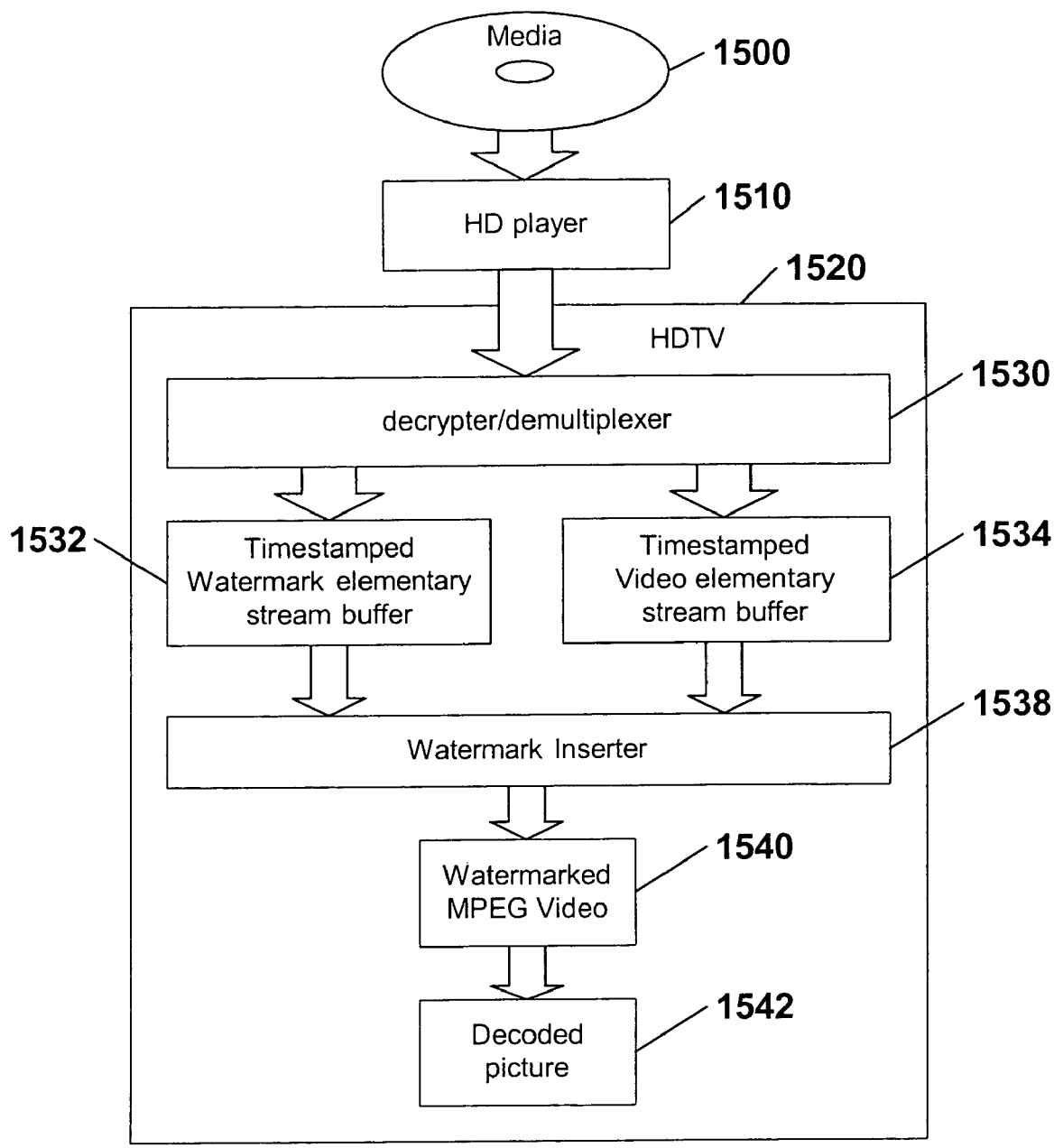
FIG. 15 is a block diagram showing an embodiment of the present invention wherein watermarks are inserted into the content in the HDTV.

FIG. 15 shows a block diagram of another embodiment of the present invention demonstrating how video watermark insertion may occur in an HDTV 1520. As illustrated, the content is contained on a media 1500. The content is read and processed by an HD player 1510 which produces a transport stream such as ATSC and modulated using a modulation scheme such as 8-VSB, containing processed content for display. The processed content is input into the HDTV, where it may be decrypted and demultiplexed by a decrypter/demultiplexer device 1530. Next the data is stored into buffers. In this example, the timestamped watermark elementary stream is buffered in a timestamped watermark elementary stream buffer 1532. The timestamped video elementary stream is buffered in a timestamped video elementary stream buffer 1534. Both the buffered watermark and video data are input into a watermark inserter 1538 where watermarks are inserted into the video stream producing a watermarked video stream 1540 such as MPEG video. The watermarks are inserted when the timestamps (DTS/PTS) match the current Video picture DTS/PTS time stamps The watermarked video stream 1540 is then displayed as a decoded image 1542.

One skilled in the art will appreciate that the concept of watermarking as presented may equally be applied to other types of data streams besides video, such as audio, executable or process data. Executable data may include programs intended for execution on a target device such as a smart HDTV. Process data may include data or files that communicate information such as HTML or XML to a target device.

Trick Modes

Figure 12:
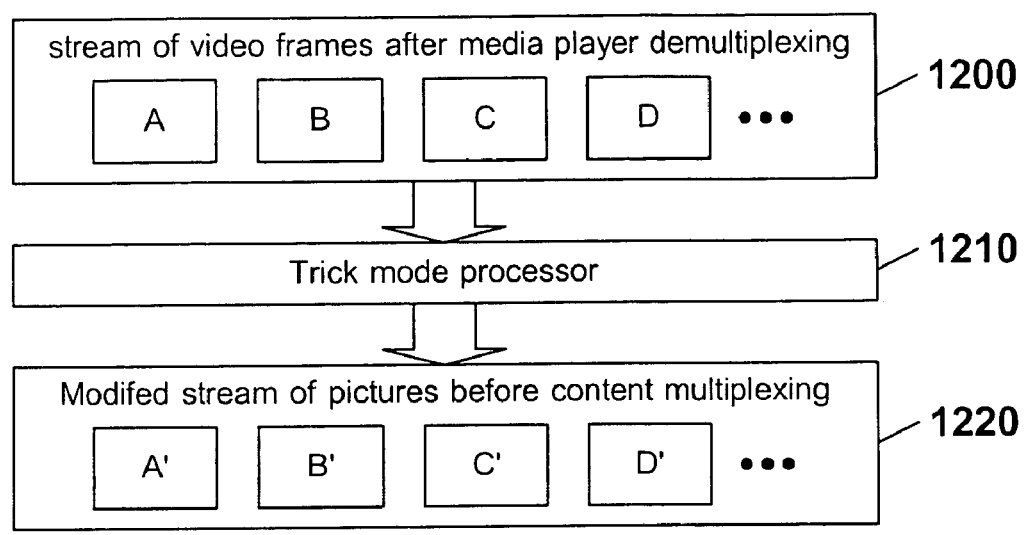
FIG. 12 is a block diagram showing trick mode processing.

Trick modes modify the video stream to produce output display effects such as pause, slow motion, fast forward and reverse. Traditionally, trick modes are generated directly by decompression chips. The present invention may generate trick modes altering the video stream before it is decoded. FIG. 12 shows a video stream 1200 being input to a trick mode processor 1210. The output of the trick mode processor 1210 is a modified video stream 1220 that may now be multiplexed with other content streams before being converted into a stream of transport packets. The video frames are typically MPEG frames. MPEG frames include P frames, B frames and I frames. I frames, are video frames known as Intra-coded pictures (I-pictures). I frames are coded in such a way that they can be decoded without knowing anything about other pictures in a video sequence. P frames, are video frames known as predictive coded pictures (P-pictures). P frames are decoded using information from another frame that was displayed earlier. B frames, are video frames known as bidirectionally predicted pictures (B-pictures). B frames are bi-directionally decoded using information from other frames. The other frames may occur before or after the B frame. P frames and B frames are often referred to as predictive frames. Trick modes may be achieved by extracting MPEG-2 video elementary frames using search algorithms. The frames may be converted to a valid MPEG-2 video elementary stream by adjusting headers, like the temporal reference fields of picture headers and by inserting empty P frames or empty B frames. An empty frame has null motion vectors, no residual data coded (coded block pattern is 0) and has the property of repeating the content of one of the reference frames. These techniques, along with a time stamp correction provides the possibility to generate a valid MPEG-2 elementary video stream with a valid number of frames per second (29.97 for NTSC for example). The impact on the content processor 214 is that it must continuously output the data stream. A stack of queued transport packets transferred in hardware by DMA may reduce the amount of CPU required.

Each picture header and PES (program elementary stream) header may be changed to reflect the insertion or deletion of pictures in the elementary video stream. Because of the interdependency of I, P and B frames, some rules may need to be followed including: (1) any B frame may be suppressed or inserted; (2) a P frame may be suppressed only if all other frames dependent upon the suppressed P frame are also suppressed.

Figure 13:
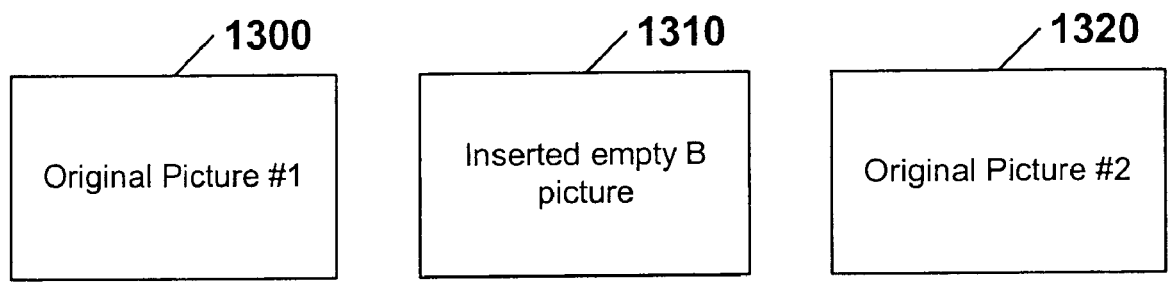
FIG. 13 is a block diagram showing how the slow motion playback trick mode can be obtained by inserting empty B pictures.

FIG. 13 shows a sequence of frames where the first frame 1300 is a first original picture. Empty B frame(s) 1310 may be inserted into the video stream to create a slow motion or pause effect. Then a second original picture 1320 is input to the video stream. Fast forward and rewind playback may be obtained by playing back I frames and inserting empty B frames to adjust playback speed and control the bitrate.

Although the trick modes are described here in terms of MPEG-2 frames, one skilled in the art will recognize that the present invention may be practiced on other types of video that utilize predictive video frames.

Data Flow

Figure 14:
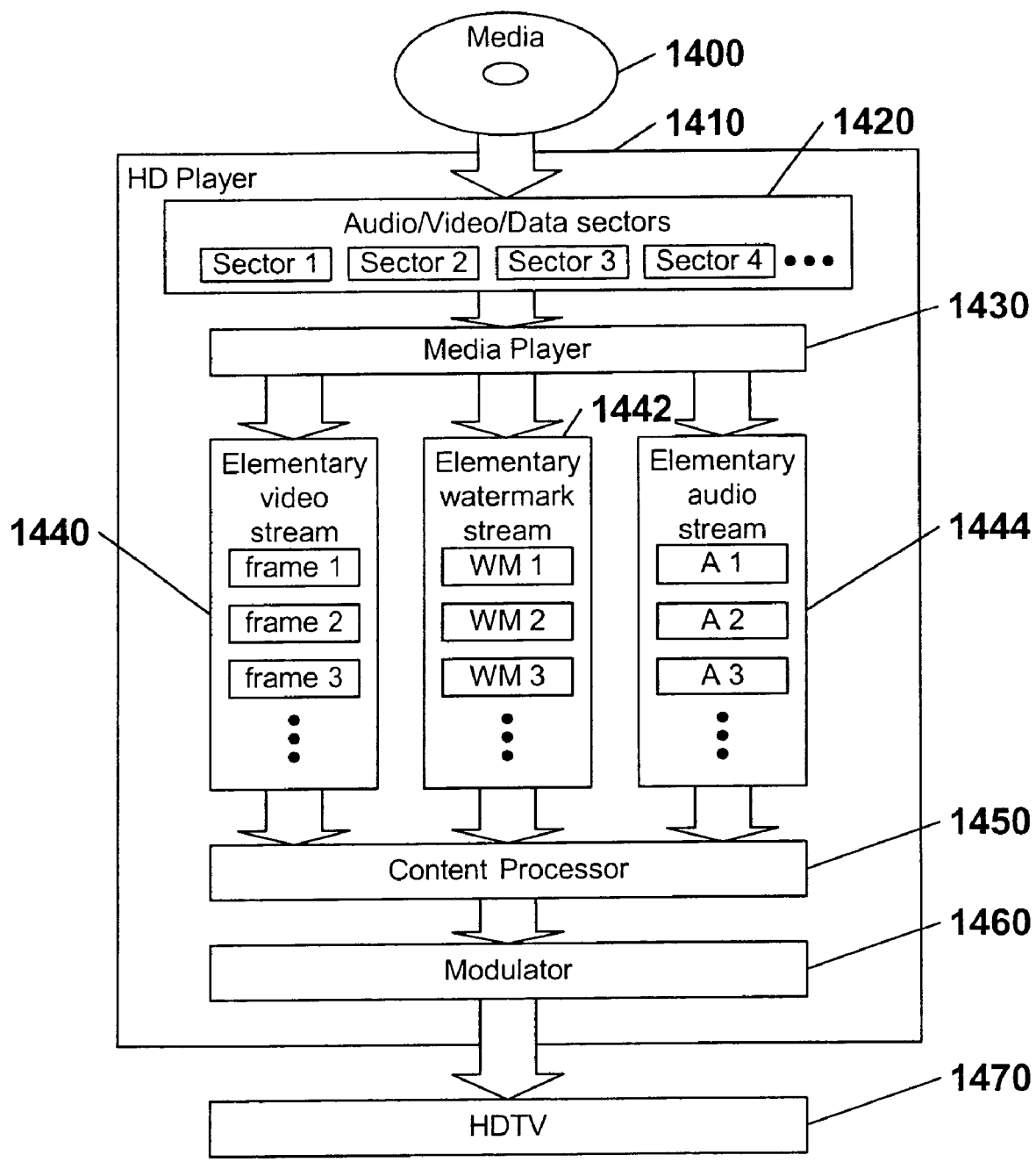
FIG. 14 is a block diagram showing data flow through an embodiment of the present invention.

FIG. 14 is a block diagram that shows the data flow through an embodiment of the present invention during playback of high definition content with real-time conversion to a packet transport stream. The high definition digital content is authored and stored on storage media 1400. An HD player 1410 may then read the content from the media 1400. The content may be stored as audio, video, and data sectors 1420. An example of a storage media may be a classic DVD disc, extended with High Definition Video formats and an example of a data sector type may be DVD sector. A media player 1430 may include a media reader and media reader logic. Data may be extracted from the sectors 1430 and demultiplexed into elementary streams including an elementary video stream 1440, an elementary watermark stream 1442, and an elementary audio stream 1444. Timestamps may be included within the elementary data streams. These streams may be input to a content processor 1450 where they may be processed. Processes may include insertion of watermarks, processing trick output display modes, multiplexing content streams, and transport packet generation. The output of the content processor 1450 may be transport packets such as ATSC transport packets. Content multiplexing may need to follow packet alignment methods to ensure valid decrypted elementary streams when the streams are encrypted. A modulator 1460 may modulate the output packets for transport to an HDTV 1470. The HDTV may also perform functions on the content including demultiplexing the elementary streams, decoding the content, decrypting the content, watermarking the content and displaying the content.

The present invention provides extensions of media formats including DVD to high resolution video, while maintaining most of the current architectures. An added benefit of this invention is backward compatibility, although backward compatibility may be limited to some audio and video format. These HD-DVD extensions provide for encrypting content, watermarking content, and trick playback display modes.

Although the present invention has been fully described by way of examples with reference to the accompanying drawings, it is to be noted that various changes and modifications will be apparent to those skilled in the art. For example, it will be apparent to those of skill in the art that the content may be provided from any type of source device for processing and playback on other devices according to principles of the present invention. Therefore, unless such changes and modifications depart from the scope of the present invention, they should be construed as being included therein.

I claim:

1. An apparatus for playing high definition content comprising:
   (a) a high definition media player for receiving multiplexed high definition content from a media source, said multiplexed high definition content and timestamps contained in data packets;
   (b) a content processor for processing said multiplexed high definition content into transport packets; and
   (c) an HDTV comprising:
      (1) a decrypter;
      (2) a demultiplexer;
      (3) a watermark buffer for receiving watermark data;
      (4) a video buffer for receiving video data; and
      (5) a watermark inserter for inserting watermarks into the video data, determined by the video data and watermark data.

2. The apparatus according to claim 1, wherein said data packets are contained in sectors.

3. The apparatus according to claim 1, further including a transport packet modulator for modulating said transport packets.

4. The apparatus according to claim 1, wherein said data packets comprise at least one of:
   (a) watermark data;
   (b) video data;
   (c) audio data;
   (d) executable data; and
   (e) process data.

5. The apparatus according to claim 1, wherein preselected blocks of said data packets are encrypted.

6. The apparatus according to claim 1, wherein said media source is an optical disc.

7. The apparatus according to claim 2, wherein said sectors are DVD sectors, and said content processor generates an ATSC transport system.

8. The apparatus according to claim 4, wherein said watermark data includes at least one of:
   (a) a watermark identifier;
   (b) an offset;
   (c) a presentation time stamp;
   (d) original data; and
   (e) size data.

9. The apparatus according to claim 4, wherein said video data includes at least one of the following:
   (a) a start code; and
   (b) a watermark identifier.

10. The apparatus according to claim 1, wherein said content processor further includes a trick mode generator.

11. The apparatus according to claim 10, wherein said trick mode generator can create a slow motion effect by inserting empty predictive frames into a video elementary stream between picture frames, wherein the rate of said slow motion effect is determined by the quality of predictive frames instead.

12. The apparatus according to claim 10, wherein said trick mode generator can create a pause effect by inserting into a video elementary stream a multitude of predictive frames.

13. The apparatus according to claim 10, wherein said trick mode processor can create a fast forward playback effect by inserting forwardly sequenced Intra-coded picture frames interspersed with empty predictive frames into a transport packet stream, wherein the rate of said fast forward motion effect is determined by the quantity of Intra-coded picture frames and predictive frames.

14. The apparatus according to claim 10, wherein said trick mode processor can create a rewind playback effect by inserting reverse sequenced Intra-coded picture frames interspersed with empty predictive frames into a transport packet stream, wherein the rate of said rewind playback effect is determined by the quantity of Intra-coded picture frames and predictive frames.

15. The apparatus according to claim 10, wherein said trick mode processor can create a playback effect by inserting Intra-coded picture frames interspersed with frames into a transport packet stream.

16. A method for playing multiplexed high definition content comprising:
   (a) receiving multiplexed high definition content from a media source, said multiplexed high definition content and timestamps contained in data packets;
   (b) processing said multiplexed high definition content into transport packets; and (c) outputting said transport packets to an HDTV, said HDTV comprising:
  (1) a decrypter;
  (2) a demultiplexer;
  (3) a watermark buffer for receiving watermark data;
  (4) a video buffer for receiving video data; and
  (5) a watermark inserter for inserting watermarks into the video data, determined by the video data and watermark data.

17. The method according to claim 16, wherein said data packets are contained in sectors.

18. The method according to claim 16, further including the steps of:
  (a) modulating said transport packets; and
  (b) outputting said modulated transport packets.

19. The method according to claim 16, wherein said step of receiving said multiplexed high definition content from a media sources comprises reading content from an optical disc.

20. The method according to claim 19, wherein said optical disc is a DVD and said step of reading content from an optical disc further comprises reading DVD sectors from said optical disc.

21. The method according to claim 16, wherein said step of processing said multiplexed high definition content into transport packets further includes generating a slow motion effect by inserting empty predictive frames into a video elementary stream between picture frames, wherein the rate of said slow motion effect is determined by the quantity of predictive frames inserted.

22. The method according to claim 16, wherein said step of processing said multiplexed high definition content into transport packets further includes generating a fast forward playback effect by inserting forwardly sequenced Intra-coded picture frames interspersed with empty predictive frames into a transport packet stream, wherein the rate of fast forward motion effect is determined by the quantity of Intra-coded picture frames and predictive frames.

23. The method according to claim 16, wherein said step of processing said multiplexed high definition content into transport packets further includes generating a rewind playback effect by inserting reverse sequenced Intra-coded picture frames interspersed with empty predictive frames into a transport packet stream, wherein the rate of said fast forward motion effect is determined by the quantity of Intra-coded picture frames and predictive frames.

24. The method according to claim 16, wherein said step of processing said multiplexed high definition content into transport packets further includes creating a playback effect by inserting Intra-coded picture frames interspersed with frames into a transport packet stream.

* * * * *